No. 703,182. Patented June 24, 1902.
G. H. CAUGHERTY.
HOSE COUPLING.
(Application filed Oct. 7, 1901.)
(No Model.)
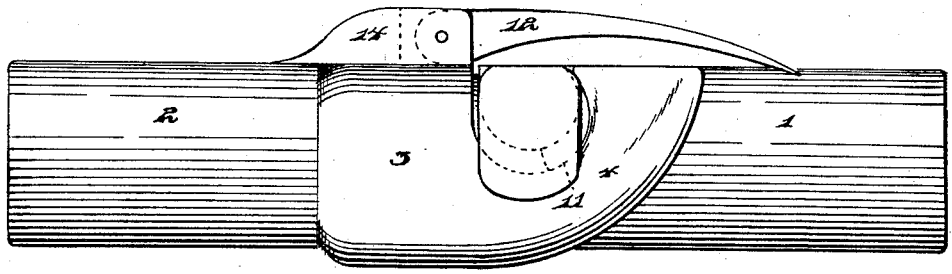
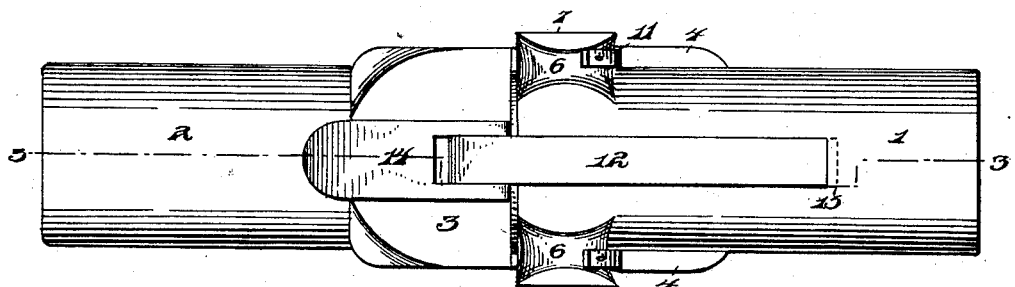
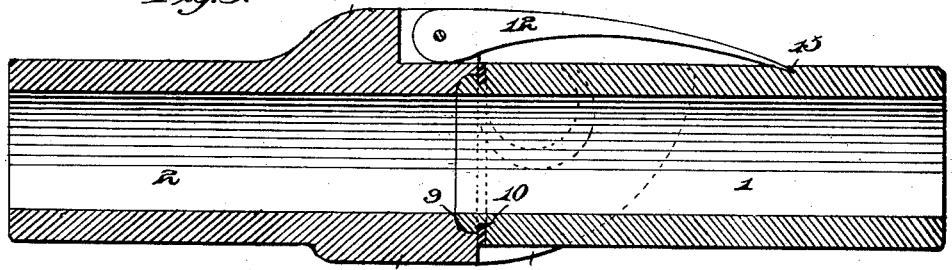
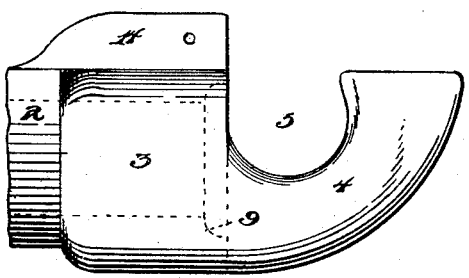
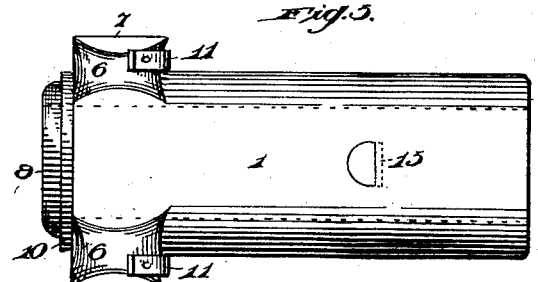
Inventor
G. H. Caugherty

UNITED STATES PATENT OFFICE.

GEORGE H. CAUGHERTY, OF MILLVALE, PENNSYLVANIA.

HOSE-COUPLING.

SPECIFICATION forming part of Letters Patent No. 703,182, dated June 24, 1902.

Application filed October 7, 1901. Serial No. 77,760. (No model.)

*To all whom it may concern:*

Be it known that I, GEORGE H. CAUGHERTY, a citizen of the United States of America, residing at Millvale, in the county of Allegheny and State of Pennsylvania, have invented certain new and useful Improvements in Hose-Coupling, of which the following is a specification, reference being had therein to the accompanying drawings.

This invention relates to certain new and useful improvements in hose-couplings, and has for its object to provide novel and effective means whereby two sections of hose may be readily joined together and a perfectly water-tight joint effected between the two.

The invention further aims to construct a coupling of this nature which while being water and air tight when the coupling is effected may be quickly and easily uncoupled when desired.

Briefly described, the invention comprises two interlocking members which receive the hose and connect the two sections of the latter together. These interlocking members are so constructed as to knuckle or interlock with each other, so that when engaged and brought into alinement the one with the other an air-tight joint will be effected. Means is provided for securing the two members in locked engagement; and the particular construction of the device by means of which I accomplish the objects of my invention will be hereinafter more specifically described and then particularly pointed out in the claims.

In describing the invention in detail reference will be had to the accompanying drawings, forming a part of this specification, and wherein like numerals of reference will be employed for designating like parts throughout the several views, in which—

Figure 1 is a side elevation of my improved coupling with the parts thereof in the coupled position. Fig. 2 is a top plan view of the same. Fig. 3 is a longitudinal sectional view taken on the line 3 3 of Fig. 2. Fig. 4 is a detail side elevation of one of the interlocking members, and Fig. 5 is a top plan view of the other member.

To put my invention into practice, I provide a male member 1 and a female member 2, which are adapted to interlock with each other and be secured rigidly together. The female member is provided on its engaging end with an enlargement or head 3, carrying claws or knuckles 4, which project beyond the head and have recesses 5 to receive projections or studs on the male member. The male member 1 is provided adjacent to its engaging end, on opposite sides, with projections, studs, or knuckles 6, having heads 7, the shank of the studs or projections being of a diameter to fit neatly in the recesses 5. The engaging end of the male member is provided with a reduced portion 8, which is adapted to fit neatly into an annular seat 9, provided therefor in the engaging end of the female member, and in order to insure a perfectly tight joint I place a washer or gasket 10 on this reduced portion, the said washer or gasket being held in an annular groove provided in the reduced portion, so as to prevent accidental displacement of the washer or gasket when coupling or uncoupling the members. In order to effect a neat fit of the studs or projections 6 in the recesses 5, I preferably secure on the rear face of these studs or projections packing-strips 11, of any suitable material, such as leather, rubber, or the like. After the two members have been locked together, as shown in Figs. 1, 2, and 3, they are firmly held by means of a lever or spring locking-tongue 12. This lever or locking-tongue 12 is pivotally mounted at one end in a boss 14 on the upper face of the member 2, the other end of the lever or tongue being sharpened to engage in a notch 15, provided therefor in the upper face of the member 1. The lever or tongue is constructed of a material having sufficient resiliency to enable its being sprung, so as to be slipped into engagement with the notch 15, and thus hold the two members in locked engagement.

To unlock the members, the locking lever or tongue is disengaged from the notch 15 and swung upwardly on its pivot, at which time the male member may be readily disengaged from the female member by elevating the end of the male member so that the latter will be at or nearly at right angles to the female member, which will permit the removal of the studs or projections from engagement with the claws of the female member. To interlock the members, the male member is held at right angles or nearly at right angles to the female member, at which time the studs or projections will readily enter the recesses 5 5, the reduced portion will enter the opening in the female member, and the male member may be pressed down into alinement with the female member, when the locking lever or tongue is forced into engagement with the notch 15 to securely lock the members in engagement.

It will of course be understood that the sections of the hose are suitably secured to the ends of the members, and in the practice of the invention it will be observed that various changes may be made in the details of construction without departing from the general spirit of the invention.

Having fully described my invention, what I claim as new, and desire to secure by Letters Patent, is—

1. A hose-coupling comprising a male member and a female member, the female member having an enlarged engaging end, with jaws projecting therefrom and recesses in said jaws, the male member having studs projecting from opposite sides thereof at the engaging end, and heads on said studs, a reduced portion carried on the engaging end of the male member to enter an annular seat provided therefor in the engaging end of the female member, and a locking lever or tongue pivoted on the female member and adapted to engage the male member to lock the members together, substantially as described.

2. A hose-coupling comprising two interlocking members, jaws carried by one member with recesses therein, studs carried by the other member for locking engagement in the recesses of said jaws, a reduced portion carried on the engaging end of one member, a gasket on said reduced portion, packing-strips secured to the studs, and a locking device carried by one member and adapted to engage the other member to lock the members together, substantially as described.

In testimony whereof I affix my signature in the presence of two witnesses.

GEORGE H. CAUGHERTY.

Witnesses:
JOHN NOLAND,
J. P. APPLEMAN.